Figure 1:
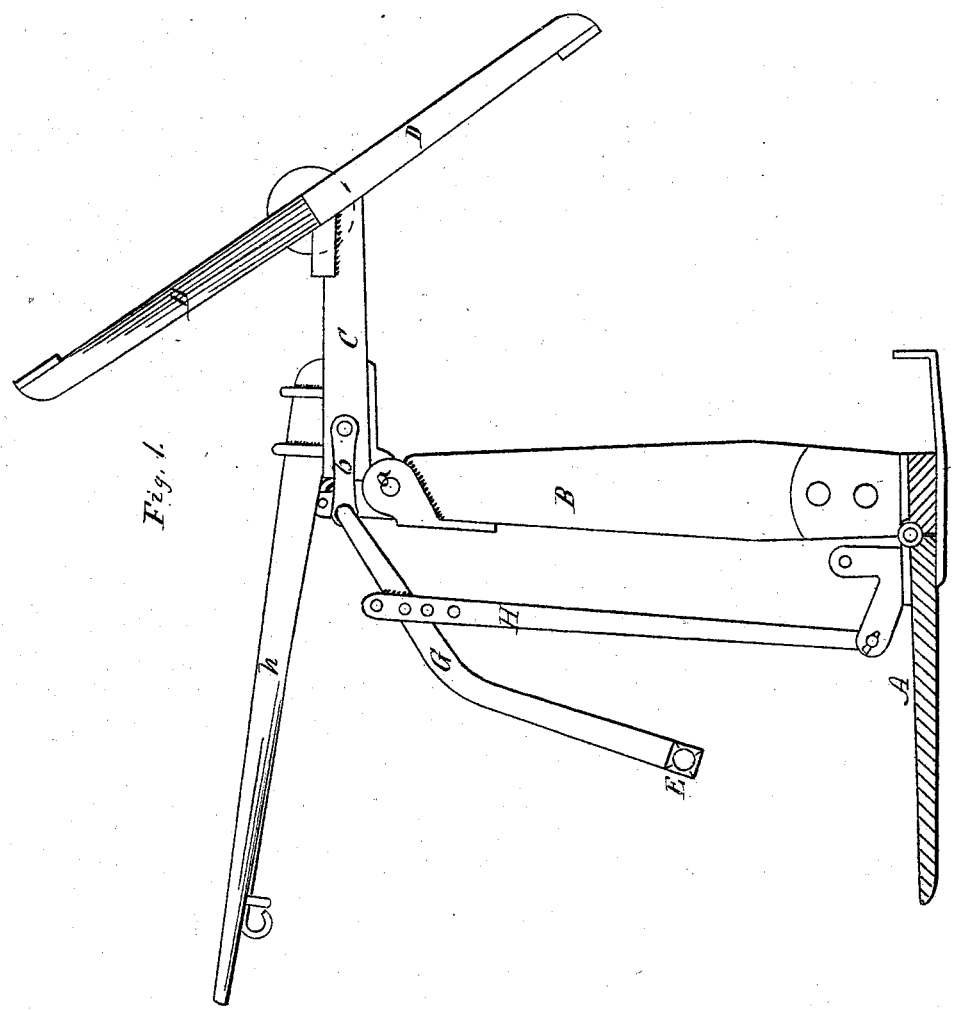

2 Sheets--Sheet 1.

D. F. LUSE.
Harvesters.

No. 150,590.     Patented May 5, 1874.

Witnesses,
S. W. Wood
Geo Bartle

Inventor,
Daniel F. Luse,
By his atty,
Jas. Brown.

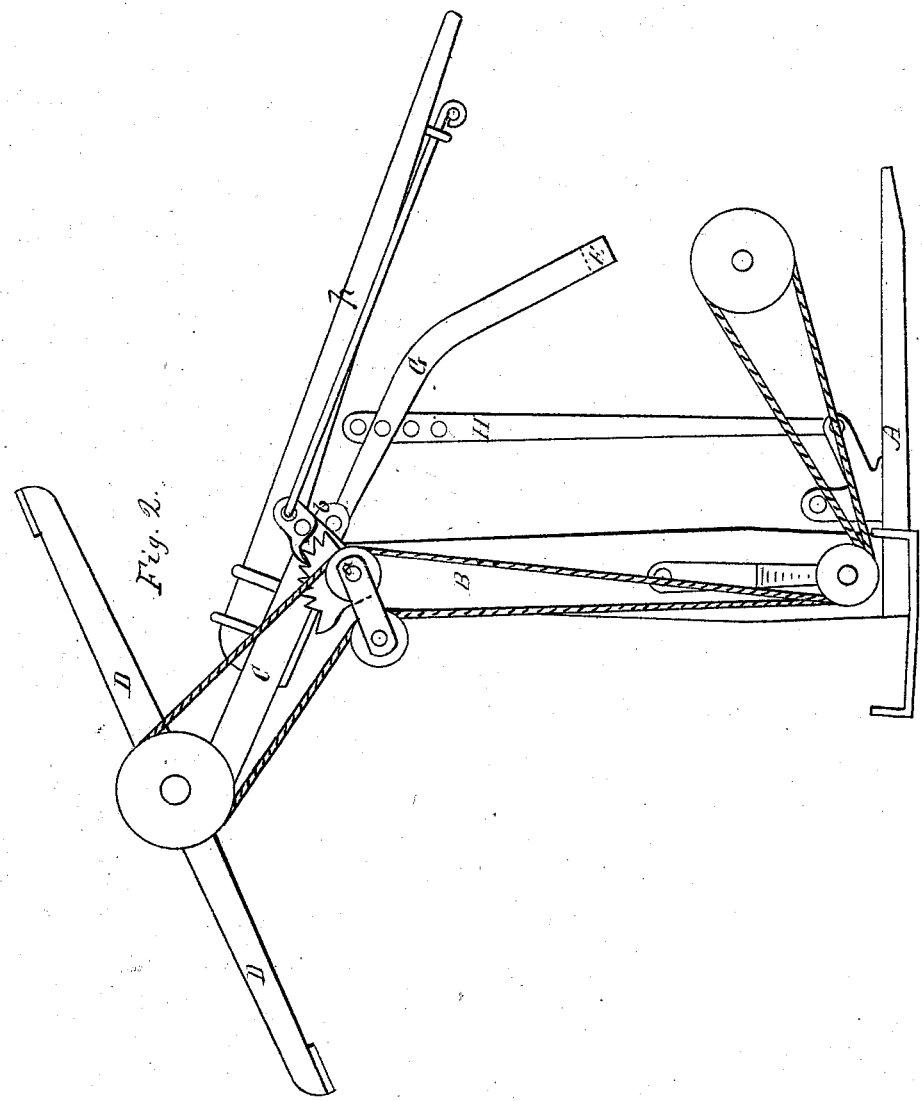

UNITED STATES PATENT OFFICE.

DANIEL F. LUSE, OF CENTRE HALL, PENNSYLVANIA.

IMPROVEMENT IN HARVESTERS.

Specification forming part of Letters Patent No. 150,590, dated May 5, 1374; application filed September 4, 1872.

*To all whom it may concern:*

Be it known that I, DANIEL F. LUSE, of Centre Hall, in the county of Centre and State of Pennsylvania, have invented an Improvement in Harvesters; and I do hereby declare that the following is a full and exact description thereof, reference being had to the accompanying drawings making part of this specification—

Figure 1 being a vertical section through the dropper and finger-bar of a harvester, and an elevation of such other parts of the harvester as may be sufficient to show the improvements; Fig. 2, an elevation of the same parts, looking in a direction opposite to the view in Fig. 1.

Like letters designate corresponding parts in both figures.

Let A represent the dropper of a harvester; B, the reel-standard; C, the reel-adjusting arm or support; D, the reel; E, the cut-off; G, the cut-off arm, and H the connecting-rod between the dropper and the cut-off arm. My improvement consists in an improved arrangement of the cut-off arm G and connecting-rod H in combination with the adjusting reel arm or support C, so that the adjustment of the reel up or down automatically causes a corresponding adjustment of the cut-off E up or down to the extent required, in the manner hereinafter set forth. It being required to have the traverse of the cut-off E in a higher position as the reel D is raised, and in a lower position as the reel is lowered, the cut-off G is pivoted to the connecting-rod H at a distance from both ends, so that it vibrates as a lever around the said pivot-connection as a fulcrum; and, in connection with this arrangement of the cut-off arm, the reel-adjusting arm C, or an attachment or flange, *b*, thereof, is extended beyond its bearing *a* on the reel-standard B, so as to make a lever of the said adjusting-arm. This extension is jointed to the forward end of the cut-off arm G, so that the two arms move together up or down, as the case may be. Therefore, as the reel D is raised with the reel-arm C, the cut-off E is correspondingly raised with the cut-off arm G, and vice versa, as indicated by the two different positions of adjustment in the two figures of the drawings. The equivalent of the reel-adjusting arm C may be used, provided it operates in the same way as a lever on the arm G. Thus the reel-arm C and cut-off arm G together compose a double lever, turning on their pivots, which connect them with the standard B and connecting-rod H, respectively, as fulcrums.

I concede to John F. Seiberling the invention of, and disclaim, the arrangement by which the cut-off arm is pivoted to the reel-adjusting arm near the reel-standard, except when the point of pivoting is between the said reel-standard and the rod that connects the dropper with the cut-off arm, whereby the purpose herein specified is effected.

What I claim as my invention, and desire to secure by Letters Patent, is—

1. The combination of the adjustable reel arm or support C and the cut-off arm G, when pivoted together at a point between the pivot-supports of the said arms respectively on the reel-standard B and connecting-rod H, substantially as and for the purpose herein specified.

2. The arrangement of the dropper A, reel-standard B, reel-adjusting arm C, cut-off arm G, and connecting-rod H, substantially as herein described, so that, while the raising and lowering of the dropper simultaneously raises and lowers the cut-off, as required, the adjustment up and down of the reel correspondingly adjusts up and down the traverse of the cut-off, as herein set forth.

Specification signed by me this 31st day of August, 1872.

D. F. LUSE.

Witnesses:
J. L. SPANGLER,
HENRY MEYER.